(12) United States Patent
Mita

(10) Patent No.: US 9,022,158 B2
(45) Date of Patent: May 5, 2015

(54) FOUR-WHEEL-DRIVE VEHICLE AND CONTROL UNIT FOR FOUR-WHEEL-DRIVE VEHICLE

(71) Applicant: JTEKT Corporation, Osaka-shi (JP)

(72) Inventor: Masaki Mita, Chiryu (JP)

(73) Assignee: JTEKT Corporation, Osaka-shi (JP)

( * ) Notice: Subject to any disclaimer, the term of this patent is extended or adjusted under 35 U.S.C. 154(b) by 164 days.

(21) Appl. No.: 13/772,549

(22) Filed: Feb. 21, 2013

(65) Prior Publication Data

US 2013/0220722 A1 Aug. 29, 2013

(30) Foreign Application Priority Data

Feb. 29, 2012 (JP) ................. 2012-043032

(51) Int. Cl.
*B60K 17/34* (2006.01)
*B60K 17/35* (2006.01)
*B60K 23/08* (2006.01)

(52) U.S. Cl.
CPC ............. *B60K 17/3505* (2013.01); *B60K 17/34* (2013.01); *B60K 23/0808* (2013.01)

(58) Field of Classification Search
CPC .................................................. B60K 23/0808
USPC ....................................................... 180/233
See application file for complete search history.

(56) References Cited

U.S. PATENT DOCUMENTS

| | | | | |
|---|---|---|---|---|
| 5,819,194 | A * | 10/1998 | Hara et al. ...................... 701/89 |
| 6,907,953 | B2 * | 6/2005 | Shigeta et al. ................ 180/248 |
| 7,048,084 | B2 * | 5/2006 | Shigeta et al. ................ 180/248 |
| 7,490,690 | B2 * | 2/2009 | Ohno et al. ................... 180/247 |
| 8,229,640 | B2 * | 7/2012 | Shigeta et al. .................. 701/72 |
| 8,412,429 | B2 * | 4/2013 | Mita et al. ....................... 701/68 |
| 8,825,324 | B2 * | 9/2014 | Horaguchi et al. ............. 701/67 |
| 2001/0042652 | A1 * | 11/2001 | Watson et al. ................ 180/249 |
| 2004/0038775 | A1 * | 2/2004 | Shimizu et al. ................... 477/6 |
| 2009/0076696 | A1 * | 3/2009 | Perkins et al. .................. 701/69 |
| 2009/0277711 | A1 * | 11/2009 | Hoffmann et al. ............ 180/247 |

(Continued)

FOREIGN PATENT DOCUMENTS

JP 2003-220847 8/2003

OTHER PUBLICATIONS

Extended European Search Report issued Jun. 19, 2013 in Patent Application No. 13156776.0.

*Primary Examiner* — Joseph Rocca
*Assistant Examiner* — Conan Duda
(74) *Attorney, Agent, or Firm* — Oblon, McClelland, Maier & Neustadt, L.L.P.

(57) ABSTRACT

A four-wheel-drive vehicle includes a dog clutch provided between a propeller shaft and an engine, a torque coupling provided between a rear differential and rear wheels, and an ECU that controls the dog clutch and the torque coupling. When a drive mode is switched from a two-wheel-drive mode where the transmissions of torque by the dog clutch and the torque coupling are both interrupted, to a four-wheel-drive mode, the ECU sets the amount of torque that is transmitted by the torque coupling to a first torque value ($T_1$) to increase the speed of rotation of the propeller shaft, and then sets the amount of torque that is transmitted by the torque coupling to a second torque value ($T_2$) that is lower than the first torque value ($T_1$), and engages the dog clutch when the rotations of first and second rotary members of the dog clutch are synchronized with each other.

5 Claims, 7 Drawing Sheets

FIRST EMBODIMENT

(56) References Cited

U.S. PATENT DOCUMENTS

| | | |
|---|---|---|
| 2010/0094519 A1 | 4/2010 | Quehenberger et al. |
| 2011/0167944 A1* | 7/2011 | Yoshinami et al. .......... 74/473.1 |
| 2014/0058638 A1* | 2/2014 | Taniguchi et al. .............. 701/69 |
| 2014/0129105 A1* | 5/2014 | Shigeta et al. .................. 701/69 |
| 2014/0136062 A1* | 5/2014 | Mita ................................ 701/65 |
| 2014/0172258 A1* | 6/2014 | Mita et al. ....................... 701/69 |

\* cited by examiner

FIRST EMBODIMENT

FIRST EMBODIMENT

FIRST EMBODIMENT

FIRST EMBODIMENT

FIRST EMBODIMENT

FIRST EMBODIMENT

FIRST EMBODIMENT

SECOND EMBODIMENT

FOUR-WHEEL-DRIVE VEHICLE AND CONTROL UNIT FOR FOUR-WHEEL-DRIVE VEHICLE

INCORPORATION BY REFERENCE

The disclosure of Japanese Patent Application No. 2012-043032 filed on Feb. 29, 2012 including the specification, drawings and abstract is incorporated herein by reference in its entirety.

BACKGROUND OF THE INVENTION

1. Field of the Invention

The invention relates to a four-wheel-drive vehicle, and a control unit for the four-wheel-drive vehicle.

2. Description of Related Art

In some conventional four-wheel-drive vehicles, transmission of torque is interrupted on both input and output sides of a propeller shaft to prevent rotation of the propeller shaft while the vehicle is travelling in a two-wheel-drive mode, in order to improve the fuel efficiency by reducing power loss caused by the rotation of the propeller shaft while the vehicle is travelling in the two-wheel-drive mode (refer to, for example, Japanese Patent Application Publication No. 2003-220847 (JP 2003-220847 A)).

The four-wheel-drive vehicle described in Japanese Patent Application Publication No. 2003-220847 has a transfer clutch and an automatic disconnecting differential (ADD) mechanism. The transfer clutch is provided in a transfer unit, and the ADD mechanism is arranged between a differential gear unit on auxiliary drive wheel (right and left front wheels) side and one (right front wheel) of the auxiliary drive wheels. The transfer clutch is a hydraulic clutch or an electromagnetic clutch capable of variably controlling the engagement torque. The ADD mechanism is able to switch the state of connection between an output portion of the differential gear unit and a drive shaft on the auxiliary drive wheel side, between a lock state in which the output portion and the drive shaft are connected to each other and a free state in which the output portion and the drive shaft are disconnected from each other.

The transfer clutch and the ADD mechanism are controlled by a four-wheel-drive controller that is capable of switching the drive mode between a two-wheel-drive mode in which only main drive wheels (right and left rear wheels) are driven, and a four-wheel-drive mode in which the main drive wheels and the auxiliary drive wheels are both driven. In the two-wheel-drive mode, transmission of torque by the transfer clutch and the ADD mechanism is interrupted to stop the rotation of a front propeller shaft. In order to switch the drive mode from the two-wheel-drive mode to the four-wheel-drive mode, the transfer clutch is engaged with a predetermined torque required to start the rotation of the front propeller shaft. After that, when it is determined that the input rotational speed and output rotational speed of the ADD mechanism are synchronized with each other, the ADD mechanism switches the connection state from the free state to the lock state.

In order to smoothly synchronize the rotation of the propeller shaft upon switchover from the two-wheel-drive mode to the four-wheel-drive mode, it is desirable to set the torque for rotating the propeller shaft to a high value. However, the inventor of the present invention has confirmed that if the torque is excessively high, vibrations occur at a distal end portion of the propeller shaft due to torsion of the propeller shaft. If vibrations occur at the distal end portion of the propeller shaft, the vibrations may be transmitted to a driver and a passenger and give them a sense of discomfort and it may take a long time to synchronize the rotation of the propeller shaft.

SUMMARY OF THE INVENTION

It is an object of the invention to provide a four-wheel-drive vehicle in which the drive mode is promptly switched from a two-wheel-drive mode to a four-wheel-drive mode while vibrations of a propeller shaft due to the switchover from the two-wheel-drive mode to the four-wheel-drive mode is suppressed, and a control unit for the four-wheel-drive vehicle.

An aspect of the invention relates to a four-wheel-drive vehicle that is able to travel in any one of a two-wheel-drive mode and a four-wheel-drive mode, including: a drive source that generates torque for causing the four-wheel-drive vehicle to travel; a pair of right and left main drive wheels to which the torque is constantly transmitted from the drive source regardless of whether the four-wheel-drive vehicle is traveling in the two-wheel-drive mode or in the four-wheel-drive mode; a pair of right and left auxiliary drive wheels to which the torque is transmitted from the drive source, depending upon a travelling state; a propeller shaft that transmits the torque output from the drive source toward the auxiliary drive wheels; a first engagement-disengagement device that is provided between the propeller shaft and the drive source; a second engagement-disengagement device that is provided between the propeller shaft and the auxiliary drive wheels; and a control unit that controls the first engagement-disengagement device and the second engagement-disengagement device. One of the first engagement-disengagement device and the second engagement-disengagement device is a dog clutch that includes two rotary members and that transmits the torque when the rotary members are engaged with each other. The other one of the first engagement-disengagement device and the second engagement-disengagement device is a torque coupling that is able to adjust a torque transmission amount. When a drive mode is switched from the two-wheel-drive mode in which transmission of torque by the first engagement-disengagement device and transmission of torque by the second engagement-disengagement device are both interrupted, to the four-wheel-drive mode in which the torque is transmitted from the drive source toward the auxiliary drive wheels via the propeller shaft, the control unit sets the amount of torque that is transmitted by the torque coupling to a first torque value to increase a speed of rotation of the propeller shaft, and then sets the amount of torque that is transmitted by the torque coupling to a second torque value that is lower than the first torque value, and engages the rotary members of the dog clutch with each other when a difference in rotational speed between the rotary members becomes equal to or smaller than a predetermined value.

BRIEF DESCRIPTION OF THE DRAWINGS

The foregoing further features, advantages, and technical and industrial significance of exemplary embodiments of the invention will be described below with reference to the accompanying drawings, wherein like numerals are used to represent like elements, and wherein.

DETAILED DESCRIPTION OF EMBODIMENTS

Figure 1:
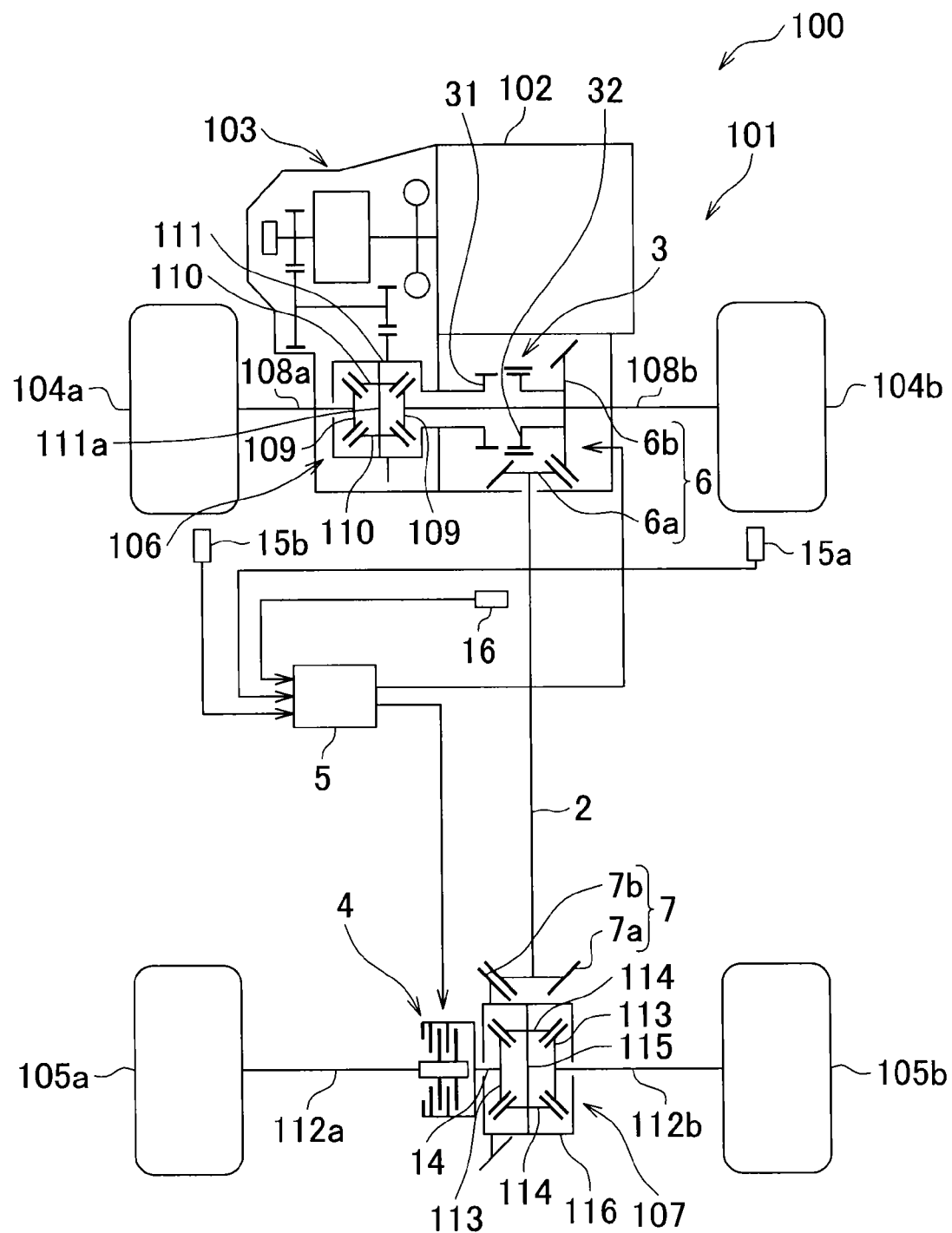
FIG. 1 is a view illustrating an example of a schematic configuration of a four-wheel-drive vehicle according to a first embodiment of the invention.

FIG. 1 is a view illustrating an example of a configuration of a four-wheel-drive vehicle 100 according to a first embodiment of the invention. As shown in FIG. 1, the four-wheel-drive vehicle 100 includes an engine 102, right and left front wheels 104b, 104a, and right and left rear wheels 105b, 105a. The engine 102 is a drive source that produces torque for causing the four-wheel-drive vehicle 100 to travel. The right and left front wheels 104b, 104a are a pair of right and left main drive wheels to which torque is constantly transmitted from the engine 102. The right and left rear wheels 105b, 105a are a pair of right and left auxiliary drive wheels to which torque is transmitted from the engine 102 depending on a travelling state.

Further, the four-wheel-drive vehicle 100 includes a propeller shaft 2, a dog clutch 3 and a torque coupling 4. The propeller shaft 2 is included in a driving force transmission system 101, and transmits torque from the engine 102 to the right and left rear wheels 105b, 105a. The dog clutch 3 may function as a first engagement-disengagement device that is provided between the propeller shaft 2 and the engine 102. The torque coupling 4 is a second engagement-disengagement device that is provided between the propeller shaft 2 and the left rear wheel 105a. Further, the four-four-wheel-drive vehicle 100 includes an ECU 5 that may function as a control unit that controls the dog clutch 3 and the torque coupling 4.

The torque of the engine 102 is transmitted to the right and left front wheels 104b, 104a via a transmission 103, a front differential 106, and right and left front wheel-side drive shafts 108b, 108a. The front differential 106 includes a pair of side gears 109, a pair of pinion gears 110 and a front differential case 111. The side gears 109 are coupled non-rotatably to the right and left front wheel-side drive shafts 108b, 108a. The pinion gears 110 are meshed with the side gears 109 with the axes of the pinion gears 110 perpendicular to the axes of the side gears 109. The front differential case 111 accommodates a pinion gear shaft 111a that supports the pinion gears 110, the side gears 109 and the pinion gears 110.

The torque of the engine 102 is transmitted to the propeller shaft 2 via the transmission 103, the front differential case 111 of the front differential 106, the dog clutch 3 and a front wheel-side gear mechanism 6. The torque of the engine 102 transmitted to the propeller shaft 2 is transmitted to the right and left rear wheels 105b, 105a via a rear wheel-side gear mechanism 7, a rear differential 107, the torque coupling 4, and rear wheel-side right and left drive shafts 112b, 112a.

The rear differential 107 includes a pair of side gears 113, a pair of pinion gears 114, a pinion shaft 115 and a rear differential case 116. The side gears 113 are coupled to the right and left drive shafts 112b, 112a. The pinion gears 114 are meshed with the side gears 113 with the gear axes of the pinion gears 114 perpendicular to the gear axes of the side gears 113. The pinion gear shaft 115 supports the pinion gears 114. The rear differential case 116 accommodates the side gears 113, the pinion gears 114 and the pinion gear shaft 115. A side gear shaft 14 is non-rotatably coupled to the left side gear 113, which is one of the pair of side gears 113. The right rear wheel-side drive shaft 112b is non-rotatably coupled to the right side gear 113, which is the other one of the pair of side gears 113.

A pinion gear 6a is coupled to one end of the propeller shaft 2, which is on the torque transmission upstream side (the engine 102 side), and a pinion gear 7a is coupled to the other end of the propeller shaft 2, which is on the torque transmission downstream side (the rear wheels 105a, 105b side). The pinion gear 6a is meshed with a ring gear 6b that serves as an output member of the dog clutch 3. The pinion gear 7a is meshed with a ring gear 7b secured to the rear differential case 116. The pinion gear 6a and the ring gear 6b constitute the front wheel-side gear mechanism 6, and the pinion gear 7a and the ring gear 7b constitute the rear wheel-side gear mechanism 7.

Rotational speed detection sensors 15a, 15b and a rotational speed detection sensor 16 are connected to the ECU 5. The rotational speed detection sensors 15b, 15a detect the rotational speeds of the right and left front wheels 104b, 104a, respectively. The rotational speed detection sensor 16 detects the rotational speed of the propeller shaft 2. The rotational speed detection sensors 15b, 15a and the rotational speed detection sensor 16 are each formed of, for example, a Hall IC that is arranged so as to face a plurality of projections and recesses that are formed, along the circumferential direction, in a magnetic body that rotates together with a corresponding one of the right and left front wheels 104b, 104a and the propeller shaft 2. The rotational speed detection sensors 15b, 15a and the rotational speed detection sensor 16 each output a pulse signal with a period that corresponds to the rotational speed of a corresponding one of the right and left front wheels 104b, 104a and the propeller shaft 2. Thus, the ECU 5 is able to detect the rotational speeds of the right and left front wheels 104b, 104a and the rotational speed of the propeller shaft 2. The ECU 5 is able to detect a rotational speed of the front differential case 111 by computing an averaged value of the rotational speeds of the right and left front wheels 104b, 104a.

Figure 2A:
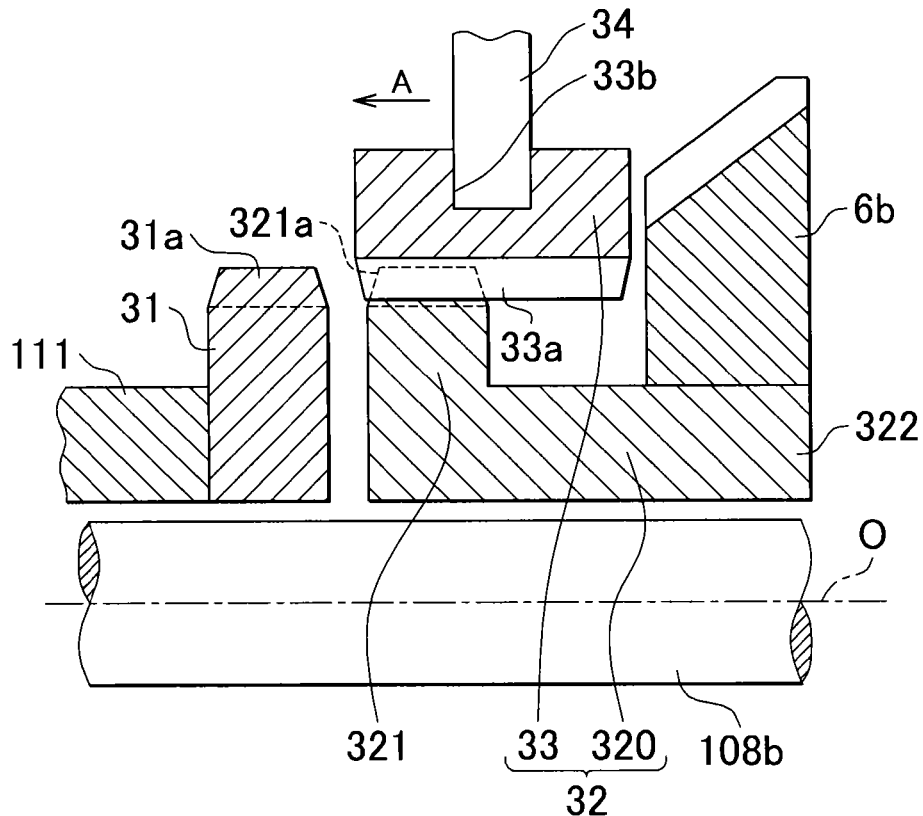
FIG. 2A is a sectional view illustrating an example of a schematic configuration of a dog clutch.

FIG. 2A is a sectional view illustrating an example of a schematic configuration of the dog clutch 3. The dog clutch 3 includes a first rotary member 31 and a second rotary member 32. The first rotary member 31 is secured to an axial end portion of the front differential case 111. The second rotary member 32 is rotatable relative to the first rotary member 31 on the same axis. The second rotary member 32 includes a cylindrical body portion 320 and a sleeve portion 33. The sleeve portion 33 is axially movable relative to the body portion 320.

The first rotary member 31 has an annular shape so that the front wheel-side drive shaft 108b passes through the first rotary member 31. The first rotary member 31 is secured to the end portion of the front differential case 111, for example, with bolts, and rotates together with the front differential case 111. A plurality of spline teeth 31a is formed in the outer periphery of the first rotary member 31.

The front wheel-side drive shaft 108b passes through the center portion of the body portion 320 of the second rotary member 32. One end portion 321 of the body portion 320, which faces the first rotary member 31, has an annular shape and is larger in outer diameter than the other portion of the body portion 320. A plurality of spline teeth 321a is formed in the outer periphery of the one end portion 321. The ring gear 6b is secured to the outer periphery of the other end portion 322 of the body portion 320, for example, with bolts so as to be non-rotatable relative to the body portion 320. The first rotary member 31 and the body portion 320 of the second rotary member 32 are supported by bearings (not shown) so as to be rotatable relative to a vehicle body independently from each other but immovable in the axial direction.

The sleeve portion 33 has a cylindrical shape, and a plurality of spline teeth 33a is formed in the inner periphery of the sleeve portion 33. The spline teeth 33a are constantly spline-engaged with the spline teeth 321a of the body portion 320. Thus, the sleeve portion 33 is non-rotatable relative to the body portion 320 but movable in the axial direction. The spline teeth 33a of the sleeve portion 33 are engaged with the spline teeth 31a of the first rotary member 31 when the sleeve portion 33 moves in the axial direction along the rotational axis O of the front wheel-side drive shaft 108b. Note that engagement between spline teeth means mesh between spline teeth.

Further, an annular groove 33b is formed in the outer periphery of the sleeve portion 33, and a fork 34 is slidably fitted in the groove 33b. The fork 34 is moved together with the sleeve portion 33 by an actuator (not shown), which is controlled by the ECU 5, in a direction indicated by an arrow A and an opposite direction, which are parallel to the rotational axis O.

Figure 2B:
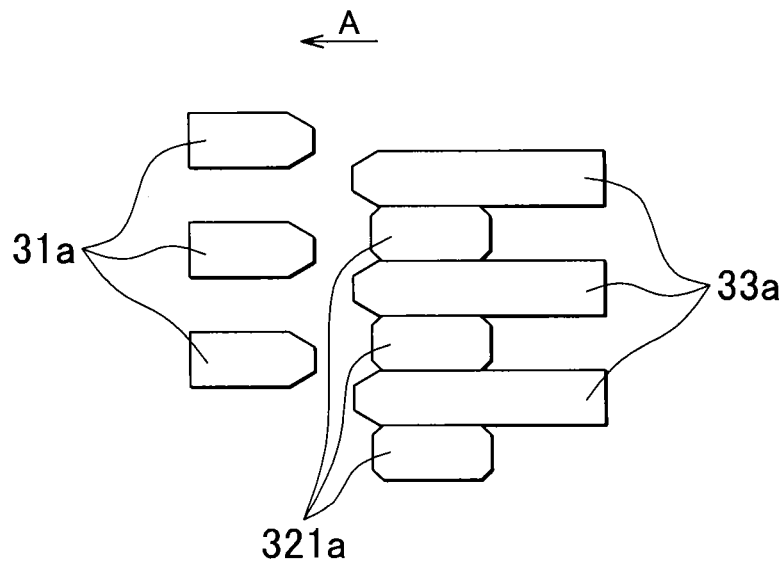
FIG. 2B is a schematic view illustrating an example of a state of engagement between spline teeth in the dog clutch.

FIG. 2B is a schematic view illustrating an example of a state of engagement between the spline teeth 31a of the first rotary member 31 and the spline teeth 321a of the body portion 320 of the second rotary member 32, and the spline teeth 33a of the sleeve portion 33. In the state shown in FIG. 2B, the spline teeth 321a of the body portion 320 of the second rotary member 32 are engaged with the spline teeth 33a of the sleeve portion 33, but the spline teeth 31a of the first rotary member 31 are not engaged with the spline teeth 33a of the sleeve portion 33. Therefore, the dog clutch 3 is in a disengaged state in which the first rotary member 31 and the second rotary member 32 are able to rotate relative to each other. Accordingly, transmission of torque between the front differential case 111 and the propeller shaft 2 is interrupted.

When the fork 34 and the sleeve portion 33 are moved in the direction of the arrow A from the above-described state, the spline teeth 33a of the sleeve portion 33 enter the spaces between the spline teeth 31a of the first rotary member 31, and thus the spline teeth 31a and the spline teeth 33a are engaged with each other. In the engaged state, the spline teeth 33a of the sleeve portion 33 are engaged with both the spline teeth 31a of the first rotary member 31 and the spline teeth 321a of the body portion 320 of the second rotary member 32. Therefore, the first rotary member 31 and the second rotary member 32 are not able to rotate relative to each other. As a result, the front differential case 111 and the propeller shaft 2 are coupled to each other such that torque is allowed to be transmitted therebetween.

When the first rotary member 31 and the body portion 320 of the second rotary member 32 are coupled to each other via the sleeve portion 33 by moving the fork 34 in the direction of the arrow A, the rotation of the first rotary member 31 and the rotation of the second rotary member 32 need to be synchronized with each other. The ECU 5 computes a rotational speed of the first rotary member 31 based on the values detected by the rotational speed detection sensors 15b, 15a. The ECU 5 computes a rotational speed of the second rotary member 32 based on the rotational speed of the propeller shaft 2, which is detected by the rotational speed detection sensor 16. If the difference between the rotational speeds is equal to or smaller than a predetermined value, that is, if the rotation of the first rotary member 31 and the rotation of the second rotary member 32 are substantially synchronized with each other, the fork 34 is moved in the direction of the arrow A to engage the sleeve portion 33 with the first rotary member 31.

Figure 3:
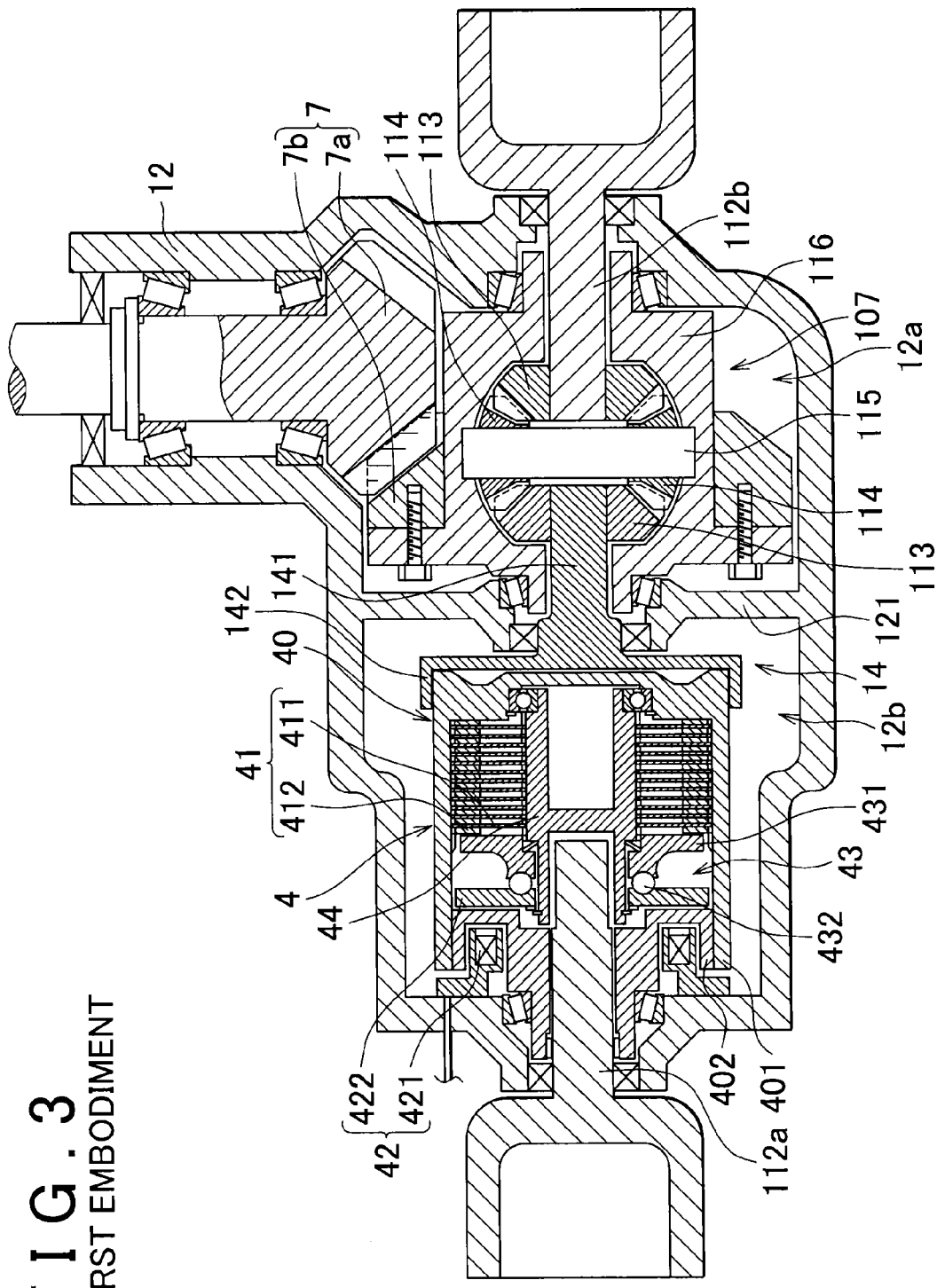
FIG. 3 is a view illustrating an example of a schematic configuration of a torque coupling and its surrounding portions.

FIG. 3 is a view illustrating an example of a schematic configuration of the torque coupling 4 and its surrounding portions. As shown in FIG. 3, the torque coupling 4 includes a multiple-disc clutch 41, an electromagnetic clutch 42, a cam mechanism 43, an inner shaft 44, and a housing 40 that accommodate these components. The torque coupling 4 is accommodated, together with the rear differential 107 and the gear mechanism 7, in a rear differential carrier 12.

The space in the differential carrier 12 is partitioned liquid-tightly into a first space 12a and a second space 12b by a partition wall 121. The first space 12a in which the gear mechanism 7 and the rear differential 107 are accommodated is filled with differential gear oil (not shown) suitable for lubricating gears, at a predetermined filling rate. Further, the second space 12b in which the torque coupling 4 is accommodated is filled with lubrication oil (not shown) suitable for lubricating inner clutch plates 411 and outer clutch plates 412, which will be described later, at a predetermined filling rate.

The side gear shaft 14 has a shaft portion 141 and a flange portion 142 that are formed integrally with each other. The shaft portion 141 is connected at one end to one of the side gears 113 of the rear differential 107, and the flange portion 142 is provided at the other end of the shaft portion 141. The shaft portion 141 is passed through the partition wall 121. The torque coupling 4 is able to adjust the amount of torque that is transmitted between the side gear shaft 14 and the left rear wheel-side drive shaft 112a.

The housing 40 of the torque coupling 4 includes a first housing member 401 and a second housing member 402. The first housing member 401 and the second housing member 402 are coupled to each other so as to be non-rotatable relative to each other. The first housing member 401 has a cylindrical shape, and the second housing member 402 is arranged so as to close one end portion of the first housing member 401. The first housing member 401 of the hosing 40 and the side gear shaft 14 are coupled to each other so as to be non-rotatable relative to each other.

The multiple-disc clutch 41 is arranged between the first housing member 401 of the housing 40 and the cylindrical inner shaft 44. The multiple-disc clutch 41 includes the inner clutch plates 411 and the outer clutch plates 412. The inner clutch plates 411 are spline-engaged with the outer periphery of the inner shaft 44 so as to be non-rotatable relative to the inner shaft 44. The outer clutch plates 412 are spline-engaged with the inner periphery of the first housing member 401 so as to be non-rotatable relative to the first housing member 401. The inner shaft 44 is spline-fitted to the left rear wheel-side drive shaft 112a so as to be non-rotatable relative to the left rear wheel-side drive shaft 112a.

The electromagnetic clutch 42 includes an annular coil 421 and an armature cam 422, and is arranged on the rotational axis of the housing 40. In the electromagnetic clutch 42, the armature cam 422 is moved toward the coil 421 by an electromagnetic force generated by the coil 421. Thus, the armature cam 422 is brought into friction sliding with the second housing member 402.

The cam mechanism 43 includes the armature cam 422, a main cam 431 and spherical cam followers 432. The armature cam 422 serves as a cam member. The main cam 431 is arranged next to the armature cam 422 along the rotational axis of the housing 40. The cam followers 432 are interposed between the main cam 431 and the armature cam 422. In the cam mechanism 43, the armature cam 422 receives a rotational force from the housing 40 upon energization of the coil 421, and converts the rotational force into a pressing force that is used as a clutch force of the multiple-disc clutch 41. As the amount of electricity that is supplied to the coil 421 is increased, a force of friction between the armature cam 422 and the second housing member 402 is increased, so that the main cam 431 presses the multiple-disc clutch 41 more strongly. That is, the torque coupling 4 is able to variably control the pressing force of the multiple-disc clutch 43 on the basis of the amount of electricity that is supplied to the coil 421, thereby adjusting the amount of torque that is transmitted between the side gear shaft 14 and the left rear wheel-side drive shaft 112a.

When the amount of torque transmitted by the torque coupling 4 is sufficiently large and the side gear shaft 14 and the left rear wheel-side drive shaft 112a are rotated together with each other, the left rear wheel-side drive shaft 112a and the propeller shaft 2 are coupled to each other such that torque is allowed to be transmitted therebetween, via the gear mechanism 7, the rear differential 107, the side gear shaft 14 and the torque coupling 4. At the same time, the right rear wheel-side drive shaft 112b and the propeller shaft 2 are coupled to each other such that torque is allowed to be transmitted therebetween, via the gear mechanism 7 and the rear differential 107.

On the other hand, when the transmission of torque by the torque coupling 4 is interrupted so that the side gear shaft 14 and the left rear wheel-side drive shaft 112a are disconnected from each other, torque is no longer transmitted to the left rear wheel-side drive shaft 112a from the propeller shaft 2. Accordingly, torque is no longer transmitted to the right rear wheel-side drive shaft 112b from the propeller shaft 2. Torque is no longer transmitted to the right rear wheel-side drive shaft 112b due to the general characteristic of a differential gear unit that if one of side gears runs idle, no torque is transmitted to the other side gear.

The ECU 5 outputs currents for actuating the dog clutch 3 and the torque coupling 4 to control the dog clutch 3 and the torque coupling 4. The ECU 5 is able to acquire various information related to the travelling state, such as the vehicle speed of the four-wheel-drive vehicle 100, the torque output from the engine 102, and the steering angle, via an in-vehicle communication network such as a controller area network (CAN).

The ECU 5 computes a command torque that should be transmitted to the rear wheels 105a, 105b on the basis of the acquired information related to the travelling state. The ECU 5 controls the dog clutch 3 and the torque coupling 4 such that the torque corresponding to the command torque is transmitted to the rear wheels 105a, 105b.

For example, when the difference in rotational speed between the front wheels 104a, 104b, and the rear wheels 105a, 105b becomes large, the ECU 5 controls the dog clutch 3 and the torque coupling 4 such that the torque that is transmitted to the rear wheels 105a, 105b is increased. With this control, if for example, the front wheels 104a, 104b slip, the travelling state is brought closer to that in the four-four-wheel-drive mode to suppress the slip of the front wheels 104a, 104b. Further, the ECU 5 controls the dog clutch 3 and the torque coupling 4 such that the torque that is transmitted to the rear wheels 105a, 105b increases with an increase in the torque output from the engine 102. Thus, it is possible to prevent a slip due to transmission of excessive torque to the front wheels 104a, 104b.

During, for example, a steady travelling state in which the four-wheel-drive vehicle 100 travels straight ahead at a constant speed, the ECU 5 interrupts both transmission of torque by the dog clutch 3 and transmission of torque by the torque coupling 4 to establish the two-wheel-drive mode in which rotation of the propeller shaft 2 is stopped. Thus, it is possible to suppress the rotational resistance due to agitation of the differential gear oil caused by the ring gear 7b, and the rotational resistances generated by bearings that support the propeller shaft 2 and the gear mechanisms 6, 7. As a result, it is possible to improve the fuel efficiency (travel distance per unit volume of fuel) of the four wheel vehicle 100.

When the ECU 5 switches the drive mode from the two-wheel-drive mode in which both transmission of torque by the dog clutch 3 and transmission of torque by the torque coupling 4 are interrupted, to the four-wheel-drive mode in which torque is transmitted from the engine 102 toward the rear wheels 105a, 105b via the propeller shaft 2, the ECU 5 sets the amount of torque that is transmitted by the torque coupling 4, to a first torque value $T_1$ to increase the speed of rotation of the propeller shaft 2, and then sets the amount of torque that is transmitted by the torque coupling 4, to a second torque value $T_2$ that is lower than the first torque value $T_1$.

The ECU 5 sets the amount of torque that is transmitted by the torque coupling 4, to the second torque value $T_2$ to increase the speed of rotation of the propeller shaft 2. Then, the ECU 5 sets the amount of torque that is transmitted by the torque coupling 4, to a third torque value $T_3$ that is lower than the second torque value $T_2$. When the difference in rotational speed between the first rotary member 31 and the second rotary member 32 of the dog clutch 3 becomes equal to or smaller than a predetermined value at the third torque value $T_3$, the ECU 5 engages the sleeve portion 33 of the second rotary member 32 with the first rotary member 31.

Then, when the ratio of the rotational speed of the second rotary member 32 to the rotational speed of the first rotary member 31 becomes equal to or higher than a first predetermined ratio, the ECU 5 switches the amount of torque that is transmitted by the torque coupling 4, from the first torque value $T_1$ to the second torque value $T_2$. When the ratio of the rotational speed of the second rotary member 32 to the rotational speed of the first rotary member 31 becomes equal to or higher than a second ratio that is higher than the first ratio, the ECU 5 switches the amount of torque that is transmitted by the torque coupling 4, from the second torque value $T_2$ to the third torque value $T_3$.

Figure 4:
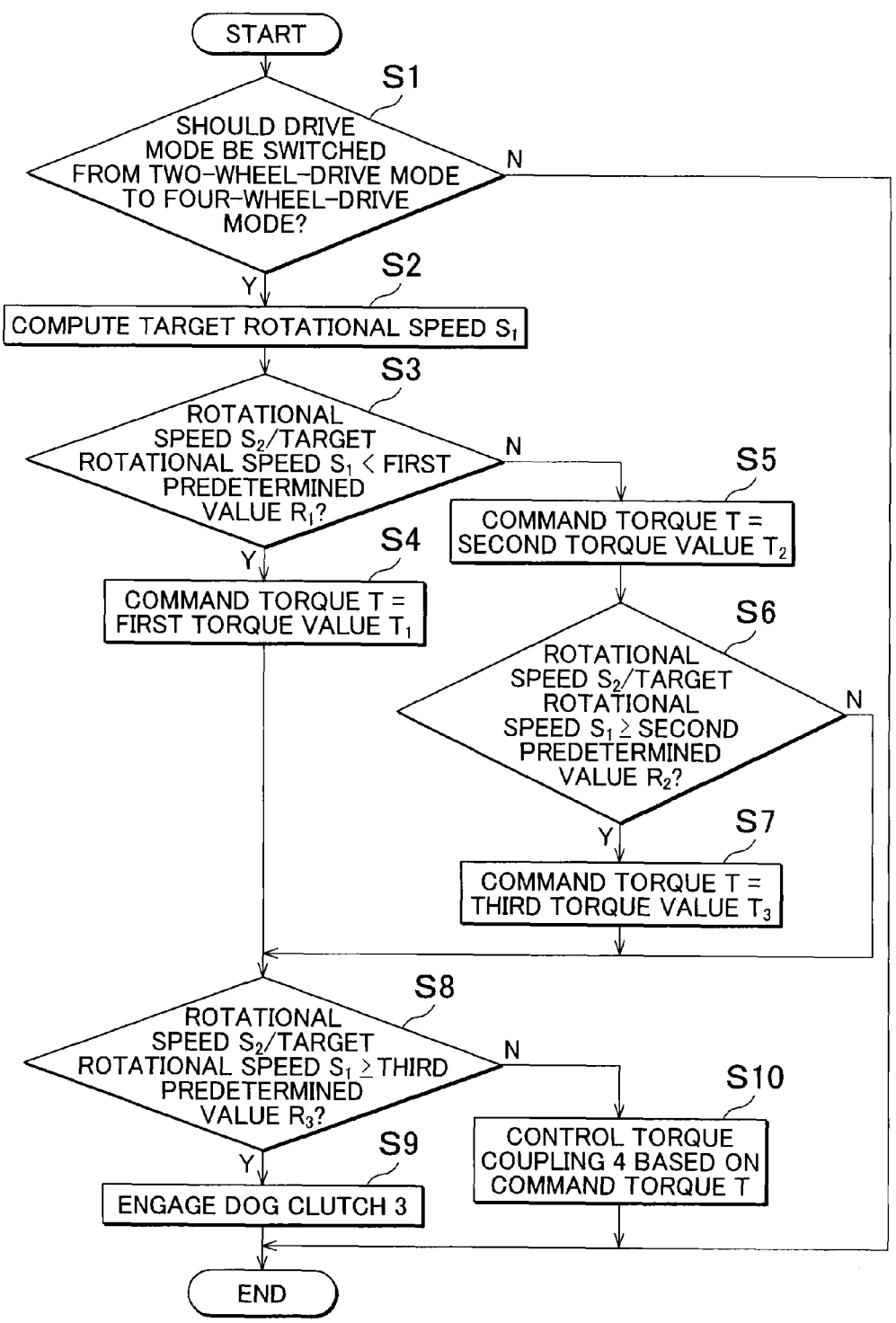
FIG. 4 is a flowchart showing an example of a process executed by an ECU.

Next, the configuration of the ECU 5 and the process executed by the ECU 5 will be described in more detail. FIG. 4 is a flowchart showing an example of the process executed by the ECU 5. The flowchart shows a concrete example of the process that is executed when the drive mode is switched from the two-wheel-drive mode to the four-wheel-drive mode, among various processes that are executed by the ECU 5. The ECU 5 repeatedly executes the process shown in the flowchart in predetermined control cycles.

The ECU 5 determines in step S1 whether the drive mode should be switched from the two-wheel-drive mode to the four-wheel-drive mode. The determination is made on the basis of, for example, information on a switch manipulation performed by a driver and the travelling state.

If it is determined that the drive mode should be switched from the two-wheel-drive mode to the four-wheel-drive mode ("YES" in step S1), the ECU 5 computes a rotational speed of the front differential case 111 on the basis of the rotational speeds of the right and left front wheels 104b, 104a, which are detected by the rotational speed sensors 15a, 15b. Then, the ECU 5 computes a target rotational speed $S_1$ on the basis of the rotational speed of the front differential case 111 (step S2). As the target rotational speed $S_1$, the rotational speed of the front differential case 111 may be used as it is, or the value obtained by multiplying the rotational speed of the front differential case 111 by a predetermined constant may be used. Alternatively, the value that is computed in step S2, which is executed immediately after an affirmative determination is made in step S1, may be stored and used as the target rotational speed $S_1$ until switchover to the four-wheel-drive mode is completed.

Next, the ECU 5 computes a rotational speed $S_2$ of the second rotary member 32 on the basis of the rotational speed of the propeller shaft 2, which is detected by the rotational speed sensor 16. Then, the ECU 5 determines whether the value obtained by dividing the rotational speed $S_2$ by the target rotational speed $S_1$ (rotational speed $S_2$/target rotational speed $S_1$) is lower than a first predetermined value $R_1$ set in advance (step S3). The first predetermined value $R_1$ may be set to, for example, 0.8. In this case, if the rotational speed $S_2$ is lower than 80% of the target rotational speed $S_1$, an affirmative determination is made in step S3. The rotational speed $S_2$ of the second rotary member 32 may be computed by dividing the rotational speed of the propeller shaft 2 by the gear ratio of the gear mechanism 6.

If the value obtained by dividing the rotational speed $S_2$ by the target rotational speed $S_1$ (rotational speed $S_2$/target rotational speed $S_1$) is lower than the first predetermined value $R_1$ ("YES" in step S3), the ECU 5 sets the command torque T, which is a command value of the amount of torque that is transmitted by the torque coupling 4, to the first torque value $T_1$ (step S4). The first torque value $T_1$ is set to such a value that the propeller shaft 2 is able to be rotated from the gear mechanism 7 side by the rotational force of the rear wheels 105a, 105b and vibration is generated at one end portion of the propeller shaft 2, which is on the drive pinion 6a side, if the torque value is maintained until the rotation of the first rotary member 31 and the rotation of the second rotary member 32 are synchronized with each other.

On the other hand, if the value obtained by dividing the rotational speed $S_2$ by the target rotational speed $S_1$ (rotational speed $S_2$/target rotational speed $S_1$) is equal to or higher than the first predetermined value $R_1$ ("NO" in step S3), the ECU 5 sets the command torque T to the second torque value $T_2$ (step S5). The second torque value $T_2$ is set to a value lower than the first torque value $T_1$. After step S5, the ECU 5 determines whether the value obtained by dividing the rotational speed $S_2$ of the second rotary member 32 by the target rotational speed S (rotational speed $S_2$/target rotational speed $S_1$) is equal to or higher than a second predetermined value $R_2$ set in advance (step S6). The second predetermined value $R_2$ is a value higher than the first predetermined value $R_1$, and may be set to, for example, 0.9. In this case, if the rotational speed $S_2$ is equal to or higher than 90% of the target rotational speed $S_1$, an affirmative determination is made in step S6.

If an affirmative determination is made in step S6, the ECU 5 sets the command torque T to a third torque value $T_3$ (step S7). The third torque value $T_3$ is a value lower than the second torque value $T_2$. On the other hand, if a negative determination is made in step S6, the command torque T is maintained at the second torque value $T_2$ set in step S5.

Next, the ECU 5 determines whether the value obtained by dividing the rotational speed $S_2$ of the second rotary member 32 by the target rotational speed $S_1$ (rotational speed $S_2$/target rotational speed $S_1$) is equal to or higher than a third predetermined value $R_3$ set in advance (step S8). The third predetermined value $R_3$ is a value which is higher than the second predetermined value $T_2$, and at which it is determined that the rotation of the front differential case 111 (first rotary member 31) and the rotation of the second rotary member 32 are substantially synchronized with each other. The third predetermined value $R_3$ may be set to, for example, 0.98.

If an affirmative determination is made in step S8, the ECU 5 axially moves the sleeve portion 33 of the second rotary member 32 toward the first rotary member 31 (refer to FIG. 2) to place the dog clutch 3 in the engaged state (step S9). As a result, the four-wheel-drive vehicle 100 is placed in the four-wheel-drive mode in which the torque of the engine 102 is transmitted toward the rear wheels 105a, 105b via the propeller shaft 2.

On the other hand, if a negative determination is made in step S8, the ECU 5 controls the torque coupling 4 on the basis of the command torque T, which is set by executing steps S3 to S7 such that the torque transmission amount becomes a value corresponding to the command torque T (step S10). More specifically, a current corresponding to the command torque T is supplied to the coil 421 of the magnetic clutch 42 (refer to FIG. 3).

Figure 5:
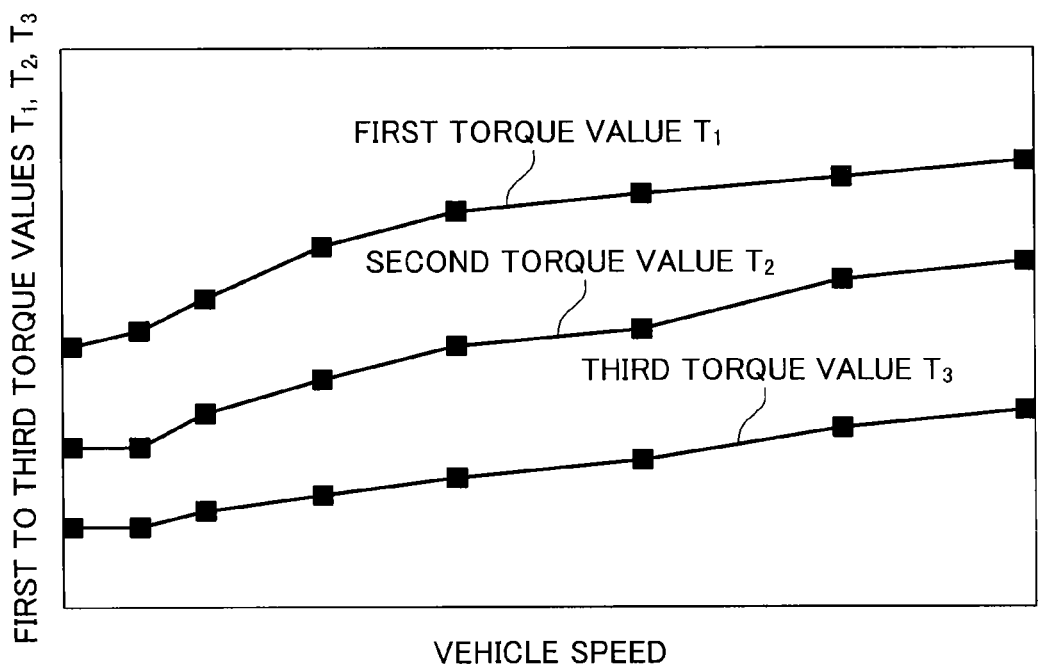
FIG. 5 is an example of a map for obtaining a first torque value $T_1$, a second torque value $T_2$ and a third torque value $T_3$.

FIG. 5 is an example of a map for obtaining the first torque value $T_1$, the second torque value $T_2$ and the third torque value $T_3$ in steps S4, S5, and S6, respectively. As shown in FIG. 5, the map is set such that the first torque value $T_1$, the second torque value $T_2$ and the third torque value $T_3$ increase with an increase in the vehicle speed. In the map, at any vehicle speed, the second torque value $T_2$ is set lower than the first torque value $T_1$, and the third torque value $T_3$ is set lower than the second torque value $T_2$ (first torque value $T_1$>second torque value $T_2$>third torque value $T_3$).

The first torque value $T_1$, the second torque value $T_2$ and the third torque value $T_3$ may be changed, depending upon a temperature of the driving force transmission system 101. In this case, desirably, the first torque value $T_1$, the second torque value $T_2$ and the third torque value $T_3$ are set to higher values as the temperature of the driving force transmission system 101 becomes lower. For example, the temperature in the differential carrier 12, which is detected by a temperature sensor, may be used as the temperature of the driving force transmission system 101. Thus, when the temperature of the driving force transmission system 101 is low and accordingly the viscosity of the differential gear oil in the differential carrier 12 is high, it is possible to increase the speed of rotation of the propeller shaft 2 with an appropriate torque that is less influenced by the viscosity of the differential gear oil, by increasing the first torque value $T_1$, the second torque value $T_2$ and the third torque value $T_3$.

Figure 6A:
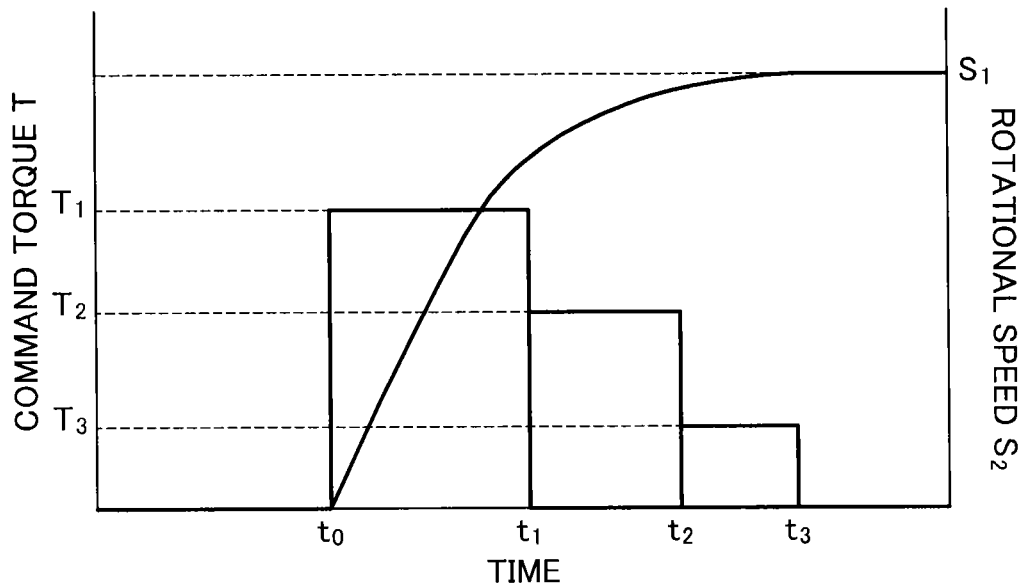
FIG. 6A is a graph that shows temporal changes in a command torque and a rotational speed of a second rotary member in the embodiment of the invention.
Figure 6B:
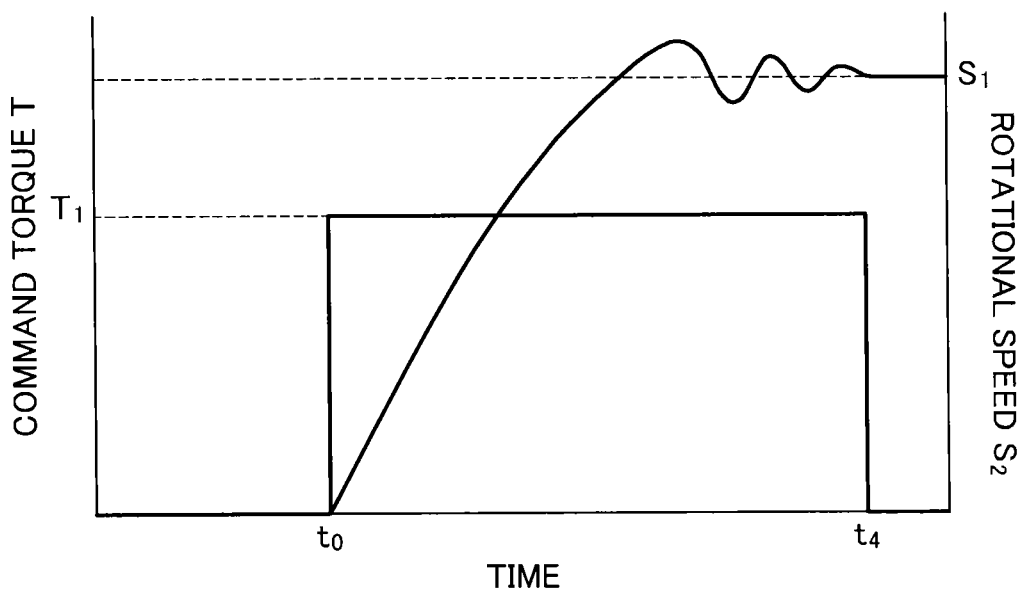
FIG. 6B is a graph that shows temporal changes in a command torque and a rotational speed of a second rotary member.

FIGS. 6A and 6B are graphs that show examples of temporal changes in the command torque T and the rotational speed $S_2$ of the second rotary member 32. In FIGS. 6A and 6B, the abscissa axis represents time, the left ordinate axis represents the command torque T, and the right ordinate axis represents the rotational speed $S_2$. FIG. 6A is a graph in the case where the process in the flowchart shown in FIG. 5 is executed, as stated above. FIG. 6B is a graph in the case of a comparative example in which the command torque T is maintained at the first torque value $T_1$ without being changed to the second torque value $T_2$ and the third torque value $T_3$.

As shown in FIG. 6A, when the drive mode is switched from the two-wheel-drive mode to the four-wheel-drive mode, the command torque T is set to the first command torque value $T_1$ at time $t_0$, then, the command torque T is set to the second command torque value $T_2$ at time $t_1$, and after that, the command torque T is set to the third command torque value $T_3$ at time $t_2$. In this way, the rotational speed $S_2$ is converged to the target rotational speed $S_1$ at time $t_3$ with no fluctuations.

On the other hand, in the case where the command torque T is set to the first command torque value $T_1$ at time $t_0$, and then the command torque T is maintained at the first command torque value $T_1$ until the rotational speed $S_2$ is converged to the target rotational speed $S_1$, as shown in FIG. 6B, the rotational speed $S_2$ fluctuates near the target rotational speed $S_1$, and is converged to the target rotational speed $S_1$ at time $t_4$ ($t_4>t_3$). In this case, uncomfortable vibrations and abnormal noise are transmitted to the driver and a passenger, and the time until the rotational speed $S_2$ is converged to the target rotational speed $S_1$ becomes long.

According to the first embodiment described above, it is possible to synchronize the rotation of the first rotary member 31 and the rotation of the second rotary member 32 within a short time while suppressing vibrations of the propeller shaft 2 during switchover from the two-wheel-drive mode to the four-wheel-drive mode. As a result, it is possible to promptly switch the drive mode from the two-wheel-drive mode to the four-wheel-drive mode.

Figure 7:
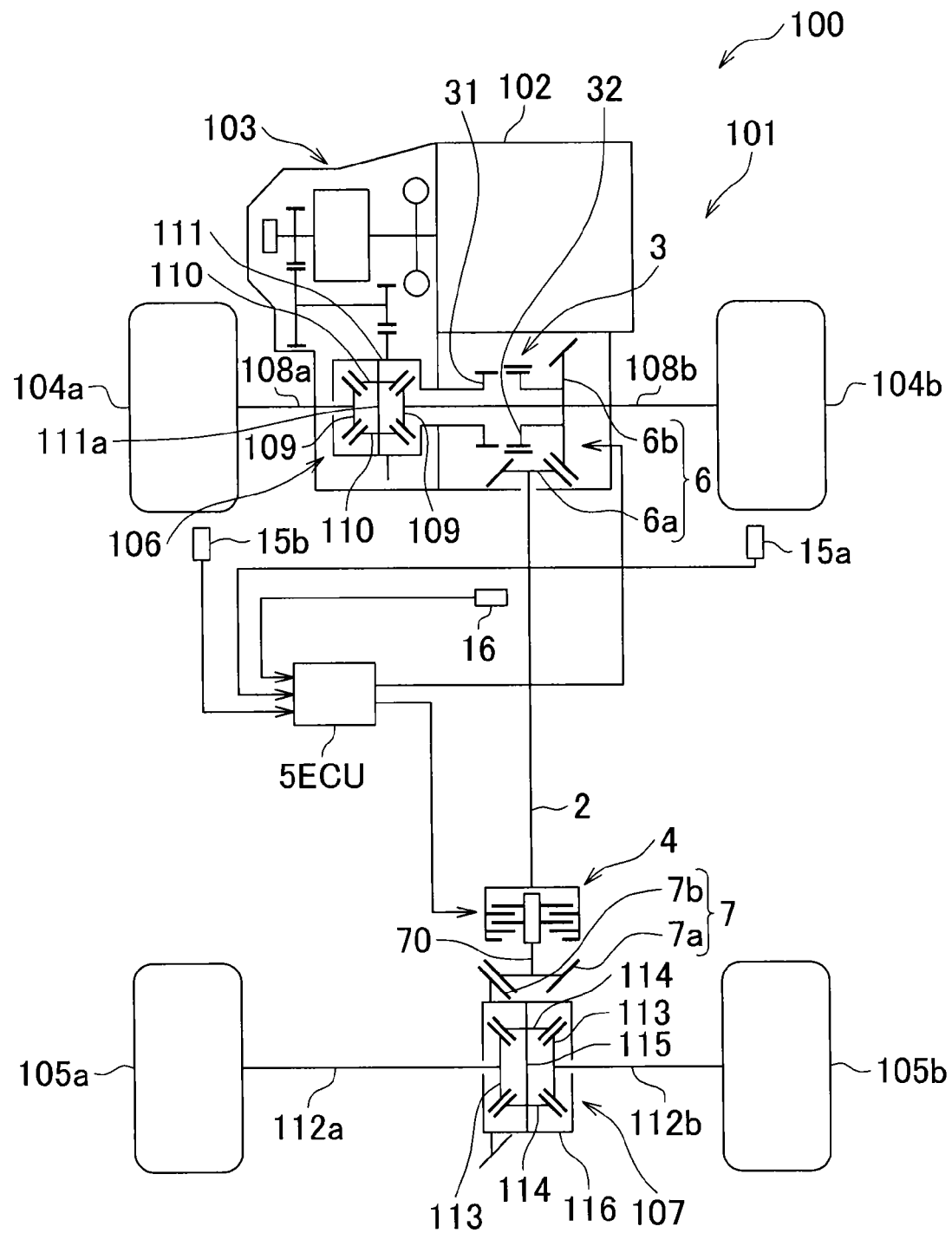
FIG. 7 is a view illustrating an example of a schematic configuration of a four-wheel-drive vehicle according to a second embodiment of the invention.

Next, a second embodiment of the invention will be described with reference to FIG. 7. FIG. 7 is a view illustrating an example of a schematic configuration of the four-wheel-drive vehicle according to the second embodiment of the invention. The components in FIG. 7 having the functions common to those described in the first embodiment will be denoted by the same reference numerals as those in the first embodiment, and description thereof will be omitted.

In the four-wheel-drive vehicle 100 in the present embodiment, the position where the torque coupling 4 is located is different from that in the first embodiment. The torque coupling 4 in the present embodiment is arranged between the propeller shaft 2 and the rear differential 107. More specifically, the housing 40 (refer to FIG. 3) of the torque coupling 4 is coupled to one end of the propeller shaft 2 so as to be non-rotatable relative the propeller shaft 2. The inner shaft 44 of the torque coupling 4 is coupled to one end of the pinion shaft 70 so as to be non-rotatable relative to the pinion shaft 70. The pinion gear 7a is coupled to the other end of the pinion shaft 70. The control executed by the ECU 5 is similar to that described in the first embodiment. In the present embodiment as well, it is possible to obtain the advantageous effects similar to those in the first embodiment.

The four-wheel-drive vehicle and the control unit for the four-wheel-drive vehicle according to the first and second embodiments of the invention have been described above. However, the invention is not limited to the above-described embodiments, and may be implemented in various other embodiments within the scope of the invention.

For example, in the above-described first and second embodiments, the command torque T is changed in three stages, that is, the first torque value $T_1$ to the third torque value $T_3$. However, the invention is not limited to this configuration. For example, the command torque T may be changed in two stages, that is, the first torque value $T_1$ and the second torque value $T_2$. In this case as well, it is possible to more promptly synchronize the rotation of the first rotary member 31 and the rotation of the second rotary member 32 while more efficiently suppressing vibrations of the propeller shaft 2 than in a case where the command torque T is maintained at a constant value.

The command torque T may be changed in multiple stages the number of which is larger than three, that is, the first torque value $T_1$ to the third torque value $T_3$. For example, the torque T may be gradually changed in each control cycle. Even in this case, because control is executed such that the command torque T is sequentially decreased, it is possible to obtain the advantageous effects similar to those in the first and second embodiments.

In the first and second embodiments, the dog clutch 3 is arranged at one end of the propeller shaft 2, which is on the engine 102 side, and the torque coupling 4 is arranged at the other end of the propeller shaft 2, which is on the rear wheels 105a, 105b side. However, the invention is not limited to this configuration. For example, the torque coupling 4 may be arranged at one end of the propeller shaft 2, which is on the engine 102 side, and the dog clutch 3 may be arranged at the other end of the propeller shaft 2, which is on the rear wheels 105a, 105b side. That is, the positions at which the dog clutch 3 and the torque coupling 4 are arranged may be switched.

In the first and second embodiments, the front wheels 104a, 104b serve as the main drive wheels and the rear wheels 105a, 105b serve as the auxiliary drive wheels. However, the invention is not limited to this configuration. That is, the invention may be applied to a four-wheel-drive vehicle in which the front wheels 104a, 104b serve as the auxiliary drive wheels and the rear wheels 105a, 105b serve as the main drive wheels. That is, as described in Japanese Patent Application Publication No. 2003-220847, there may be employed a configuration in which the torque of an engine is distributed to the front wheel-side and the rear wheel-side by a transfer unit, the torque is constantly transmitted to a pair of right and left rear wheels via a rear wheel-side propeller shaft, and the torque is transmitted, depending upon the travelling state, to a pair of right and left front wheels via a front wheel-side drive shaft. In this case, the dog clutch 3 is provided at one of a position between the front wheel-side propeller shaft and the engine and a position between the front wheel-side propeller shaft and the rear wheels, the torque coupling 4 is provided at the other one of these positions, and the dog clutch 3 and the torque coupling 4 are controlled by the ECU 5.

In the first and second embodiments, the dog clutch 3 is not provided with a synchromesh mechanism. Alternatively, the dog clutch 3 may be provided with a synchromesh mechanism in order to facilitate synchronization between the rotation of the first rotary member 31 and the rotation of the second rotary member 32.

According to the invention, it is possible to promptly switch the drive mode from the two-wheel-drive mode to the four-wheel-drive mode while suppressing vibrations of the propeller shaft during switchover from the two-wheel-drive mode to the four-wheel-drive mode.

What is claimed is:

1. A four-wheel-drive vehicle that is able to travel in any one of a two-wheel-drive mode and a four-wheel-drive mode, comprising:

a drive source that generates torque for causing the four-wheel-drive vehicle to travel;

a pair of right and left main drive wheels to which the torque is constantly transmitted from the drive source regardless of whether the four-wheel-drive vehicle is traveling in the two-wheel-drive mode or in the four-wheel-drive mode;

a pair of right and left auxiliary drive wheels to which the torque is transmitted from the drive source, depending upon a travelling state;

a propeller shaft that transmits the torque output from the drive source toward the auxiliary drive wheels;

a first engagement-disengagement device that is provided between the propeller shaft and the drive source;

a second engagement-disengagement device that is provided between the propeller shaft and the auxiliary drive wheels; and a control unit that controls the first engagement-disengagement device and the second engagement-disengagement device, wherein one of the first engagement-disengagement device and the second engagement-disengagement device is a dog clutch that includes two rotary members and that transmits the torque when the rotary members are engaged with each other, the other one of the first engagement-disengagement device and the second engagement-disengagement device is a torque coupling that is able to adjust a torque transmission amount, and when a drive mode is switched from the two-wheel-drive mode in which transmission of torque by the first engagement-disengagement device and transmission of torque by the second engagement-disengagement device are both interrupted, to the four-wheel-drive mode in which the torque is transmitted from the drive source toward the auxiliary drive wheels via the propeller shaft, the control unit sets the amount of torque that is transmitted by the torque coupling to a first torque value to increase a speed of rotation of the propeller shaft, and then sets the amount of torque that is transmitted by the torque coupling to a second torque value that is lower than the first torque value, and engages the rotary members of the dog clutch with each other when a difference in rotational speed between the rotary members becomes equal to or smaller than a predetermined value, wherein the control unit sets the amount of torque that is transmitted by the torque coupling to the second torque value to increase the speed of rotation of the propeller shaft, and then sets the amount of torque that is transmitted by the torque coupling to a third torque value that is lower than the second torque value, and engages the rotary members of the dog clutch with each other when the difference in rotational speed between the rotary members of the dog clutch becomes equal to or smaller than a predetermined value while the torque transmission amount is the third torque value.

2. A four-wheel-drive vehicle that is able to travel in any one of a two-wheel-drive mode and a four-wheel-drive mode, comprising:

a drive source that generates torque for causing the four-wheel-drive vehicle to travel;

a pair of right and left main drive wheels to which the torque is constantly transmitted from the drive source regardless of whether the four-wheel-drive vehicle is traveling in the two-wheel-drive mode or in the four-wheel-drive mode;

a pair of right and left auxiliary drive wheels to which the torque is transmitted from the drive source, depending upon a travelling state;

a propeller shaft that transmits the torque output from the drive source toward the auxiliary drive wheels;

a first engagement-disengagement device that is provided between the propeller shaft and the drive source;

a second engagement-disengagement device that is provided between the propeller shaft and the auxiliary drive wheels; and a control unit that controls the first engagement-disengagement device and the second engagement-disengagement device, wherein one of the first engagement-disengagement device and the second engagement-disengagement device is a dog clutch that includes two rotary members and that transmits the torque when the rotary members are engaged with each other, the other one of the first engagement-disengagement device and the second engagement-disengagement device is a torque coupling that is able to adjust a torque transmission amount, and when a drive mode is switched from the two-wheel-drive mode in which transmission of torque by the first engagement-disengagement device and transmission of torque by the second engagement-disengagement device are both interrupted, to the four-wheel-drive mode in which the torque is transmitted from the drive source toward the auxiliary drive wheels via the propeller shaft, the control unit sets the amount of torque that is transmitted by the torque coupling to a first torque value to increase a speed of rotation of the propeller shaft, and then sets the amount of torque that is transmitted by the torque coupling to a second torque value that is lower than the first torque value, and engages the rotary members of the dog clutch with each other when a difference in rotational speed between the rotary members becomes equal to or smaller than a predetermined value, wherein the control unit switches the amount of torque that is transmitted by the torque coupling from the first torque value to the second torque value when a ratio of a rotational speed of one of the rotary members of the dog clutch to a rotational speed of the other one of the rotary members becomes equal to or higher than a predetermined ratio, wherein the rotational speed of the one of the rotary members is lower than the rotational speed of the other one of the rotary members, and wherein the control unit sets the amount of torque that is transmitted by the torque coupling to the second torque value to increase the speed of rotation of the propeller shaft, and then sets the amount of torque that is transmitted by the torque coupling to a third torque value that is lower than the second torque value, and engages the rotary members of the dog clutch with each other when the difference in rotational speed between the rotary members of the dog clutch becomes equal to or smaller than a predetermined value while the torque transmission amount is the third torque value.

3. The four-wheel-drive vehicle according to claim 1, wherein:

the control unit switches the amount of torque that is transmitted by the torque coupling from the first torque value to the second torque value when a ratio of a rotational speed of one of the rotary members of the dog clutch to a rotational speed of the other one of the rotary members, the rotational speed of the one of the rotary members being lower than the rotational speed of the other one of the rotary members, becomes equal to or higher than a first predetermined ratio; and the control unit switches the amount of torque that is transmitted by the torque coupling from the second torque value to the third torque value when the ratio of the rotational speed of the one of the rotary members to the rotational speed of the other one of the rotary members, the rotational speed of the one of the rotary members being lower than the rotational speed of the other one of the rotary members, becomes equal to or higher than a second predetermined ratio that is higher than the first predetermined ratio.

4. The four-wheel-drive vehicle according to claim 2, wherein:

the control unit switches the amount of torque that is transmitted by the torque coupling from the first torque value to the second torque value when a ratio of a rotational speed of one of the rotary members of the dog clutch to a rotational speed of the other one of the rotary members, the rotational speed of the one of the rotary members being lower than the rotational speed of the other one of the rotary members, becomes equal to or higher than a first predetermined ratio; and the control unit switches the amount of torque that is transmitted by the torque coupling from the second torque value to the third torque value when the ratio of the rotational speed of the one of the rotary members to the rotational speed of the other one of the rotary members, the rotational speed of the one of the rotary members being lower than the rotational speed of the other one of the rotary members, becomes equal to or higher than a second predetermined ratio that is higher than the first predetermined ratio.

5. A control unit for a four-wheel-drive vehicle that includes: a drive source that generates torque for causing the four-wheel-drive vehicle to travel; a pair of right and left main drive wheels to which the torque is constantly transmitted from the drive source regardless of whether the four-wheel-drive vehicle is traveling in a two-wheel-drive mode or in a four-wheel-drive mode; a pair of right and left auxiliary drive wheels to which the torque is transmitted from the drive source, depending upon a travelling state; a propeller shaft that transmits the torque output from the drive source toward the auxiliary drive wheels; a first engagement-disengagement device that is provided between the propeller shaft and the drive source; and a second engagement-disengagement device that is provided between the propeller shaft and the auxiliary drive wheels, wherein the control unit controls a dog clutch that serves as one of the first engagement-disengagement device and the second engagement-disengagement device and that transmits the torque when rotary members of the dog clutch are engaged with each other, and a torque coupling that serves as the other one of the first engagement-disengagement device and the second engagement-disengagement device and that is able to adjust a torque transmission amount, and when a drive mode is switched from the two-wheel-drive mode in which transmission of torque by the first engagement-disengagement device and transmission of torque by the second engagement-disengagement device are both interrupted, to the four-wheel-drive mode in which the torque is transmitted from the drive source toward the auxiliary drive wheels via the propeller shaft, the control unit sets the amount of torque that is transmitted by the torque coupling to a first torque value to increase a speed of rotation of the propeller shaft, and then sets the amount of torque that is transmitted by the torque coupling to a second torque value that is lower than the first torque value, and engages the rotary members of the dog clutch with each other when a difference in rotational speed between the rotary members becomes equal to or smaller than a predetermined value, wherein the control unit sets the amount of torque that is transmitted by the torque coupling to the second torque value to increase the speed of rotation of the propeller shaft, and then sets the amount of torque that is transmitted by the torque coupling to a third torque value that is lower than the second torque value, and engages the rotary members of the dog clutch with each other when the difference in rotational speed between the rotary members of the dog clutch becomes equal to or smaller than a predetermined value while the torque transmission amount is the third torque value.

* * * * *